US010766715B2

(12) United States Patent
Stroud et al.

(10) Patent No.: US 10,766,715 B2
(45) Date of Patent: Sep. 8, 2020

(54) HIGH SPEED DIVERTER

(71) Applicant: Shuttleworth, LLC, Huntington, IN (US)

(72) Inventors: Gregory C. Stroud, Huntington, IN (US); Rhett E. Craig, Ossian, IN (US)

(73) Assignee: SHUTTLEWORTH LLC, Huntington, IN (US)

( * ) Notice: Subject to any disclaimer, the term of this patent is extended or adjusted under 35 U.S.C. 154(b) by 81 days.

(21) Appl. No.: 16/128,093

(22) Filed: Sep. 11, 2018

(65) Prior Publication Data

US 2019/0084775 A1  Mar. 21, 2019

Related U.S. Application Data

(60) Provisional application No. 62/559,132, filed on Sep. 15, 2017.

(51) Int. Cl.
| | |
|---|---|
| *B65G 47/71* | (2006.01) |
| *B07C 5/34* | (2006.01) |
| *B07B 13/05* | (2006.01) |
| *B65G 47/76* | (2006.01) |
| *B65G 47/64* | (2006.01) |
| *B07C 5/36* | (2006.01) |

(52) U.S. Cl.
CPC .............. *B65G 47/71* (2013.01); *B07B 13/05* (2013.01); *B07C 5/3412* (2013.01); *B07C 5/36* (2013.01); *B65G 47/648* (2013.01); *B65G 47/766* (2013.01)

(58) Field of Classification Search
CPC .... B65G 47/644; B65G 47/648; B65G 47/71; B65G 47/766; B07B 13/05; B07C 5/2412; B07C 5/36; B07C 5/3412
See application file for complete search history.

(56) References Cited

U.S. PATENT DOCUMENTS

| | | |
|---|---|---|
| 461,924 A | 10/1891 | Cummings |
| 1,733,409 A | 10/1929 | Howe |
| 1,822,111 A | 9/1931 | Richardson |
| 1,871,902 A | 8/1932 | Mojonnier |
| 1,930,318 A | 10/1933 | Mojonnier |
| 2,038,652 A | 4/1936 | Froehlich |
| 2,451,104 A | 10/1948 | Lowe |
| 2,558,774 A | 7/1951 | Nordquist |
| 2,701,638 A | 2/1955 | Petro |
| 3,326,349 A | 6/1967 | Pettis |
| 3,749,225 A | 7/1973 | Kennedy |
| 4,321,994 A | 3/1982 | Heuft |

(Continued)

*Primary Examiner* — Joseph C Rodriguez
(74) *Attorney, Agent, or Firm* — Thompson Hine LLP

(57) ABSTRACT

A system for diverting objects traveling along a conveyor includes an upstream conveyor segment having an inlet end and an outlet end and a downstream conveyor segment having an inlet end and an outlet end. The inlet end of the downstream conveyor segment is located to receive items from the outlet end of the upstream conveyor segment. A conveyor shift mechanism is linked to both the outlet end of the upstream conveyor segment and the inlet end of the downstream conveyor segment for carrying out lateral movement of the outlet end of the upstream conveyor segment in one lateral direction while simultaneously carrying out lateral movement of the inlet end of the downstream conveyor segment in an opposite lateral direction.

20 Claims, 25 Drawing Sheets

(56) References Cited

U.S. PATENT DOCUMENTS

| | | | |
|---|---|---|---|
| 4,443,995 A | | 4/1984 | Myers |
| 4,462,516 A | | 7/1984 | Guerzoni |
| 4,566,582 A | | 1/1986 | Linder |
| 5,186,306 A | | 2/1993 | Sjostrand |
| 5,188,210 A | * | 2/1993 | Malow ................ B65G 21/2054 198/369.5 |
| 5,191,963 A | * | 3/1993 | Delsanto ............. B65G 47/082 198/429 |
| 5,944,165 A | * | 8/1999 | Mannlein ............... B65G 47/71 198/367 |
| 5,988,356 A | | 11/1999 | Bonnet |
| 6,347,697 B1 | * | 2/2002 | Ouellette ................ B65G 43/08 198/358 |
| 7,114,609 B2 | * | 10/2006 | Christman ............ B65B 25/146 198/442 |
| 7,318,722 B2 | * | 1/2008 | Drysdale ............. B29C 45/1769 425/534 |
| 7,380,650 B2 | * | 6/2008 | Gamberini ............ B65B 25/146 198/369.1 |
| 7,591,363 B2 | | 9/2009 | Wild |
| 8,087,510 B2 | * | 1/2012 | Christensen ......... B65G 47/648 198/587 |
| 8,376,121 B2 | | 2/2013 | Weidman |
| 8,851,266 B2 | * | 10/2014 | Liu ...................... B65G 47/647 198/347.4 |
| 8,955,664 B2 | * | 2/2015 | Lim ..................... B65G 47/648 198/369.5 |
| 9,265,261 B2 | * | 2/2016 | Haas ........................ A21C 9/08 |
| 9,783,375 B2 | * | 10/2017 | Parker .................... B65G 47/71 |
| 10,336,556 B2 | * | 7/2019 | Heitplatz ........... B65G 21/2054 |
| 2005/0247542 A1 | | 11/2005 | Salvoni |
| 2007/0084698 A1 | | 4/2007 | Aubry |
| 2008/0023305 A1 | | 1/2008 | Wild |

* cited by examiner

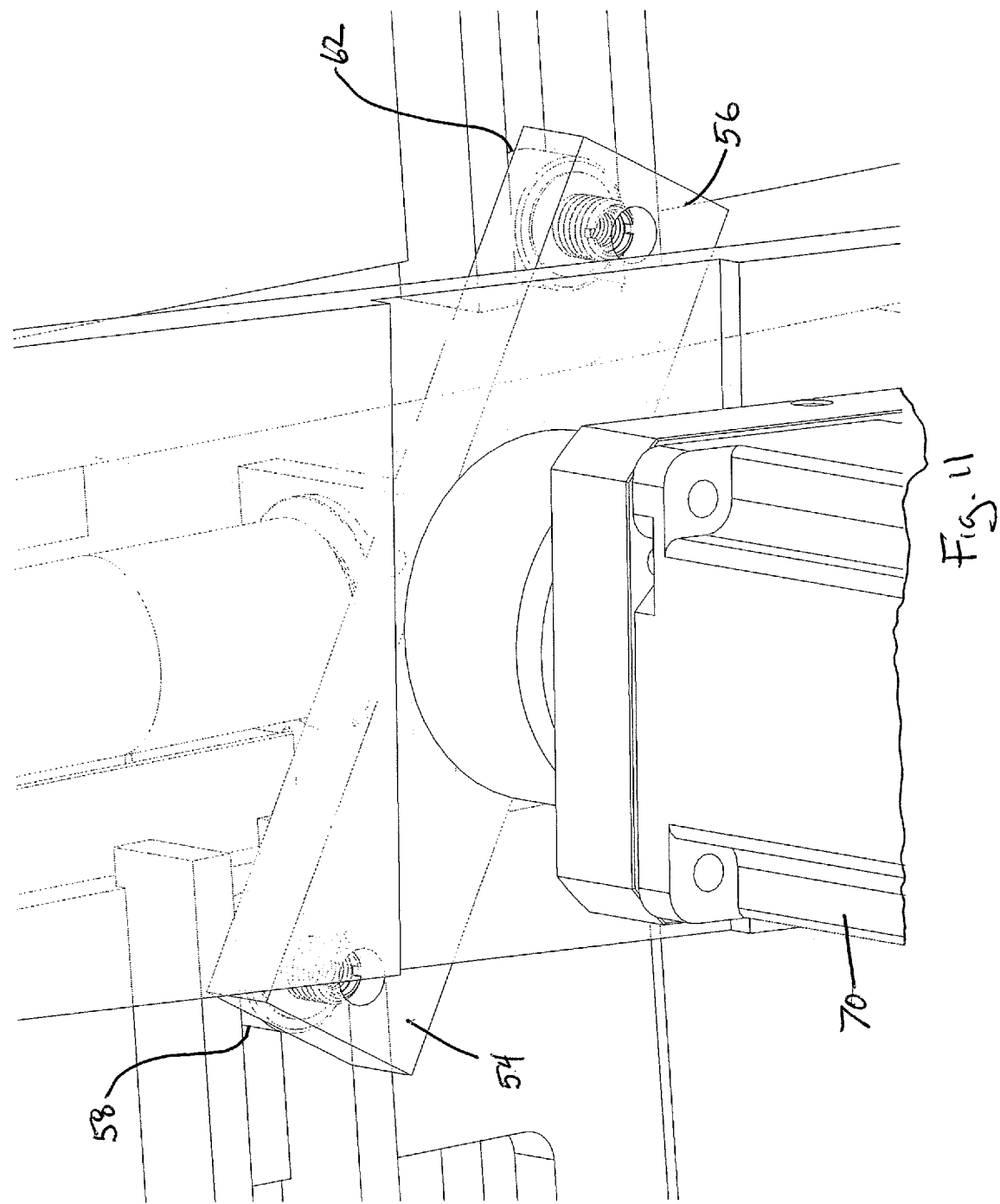

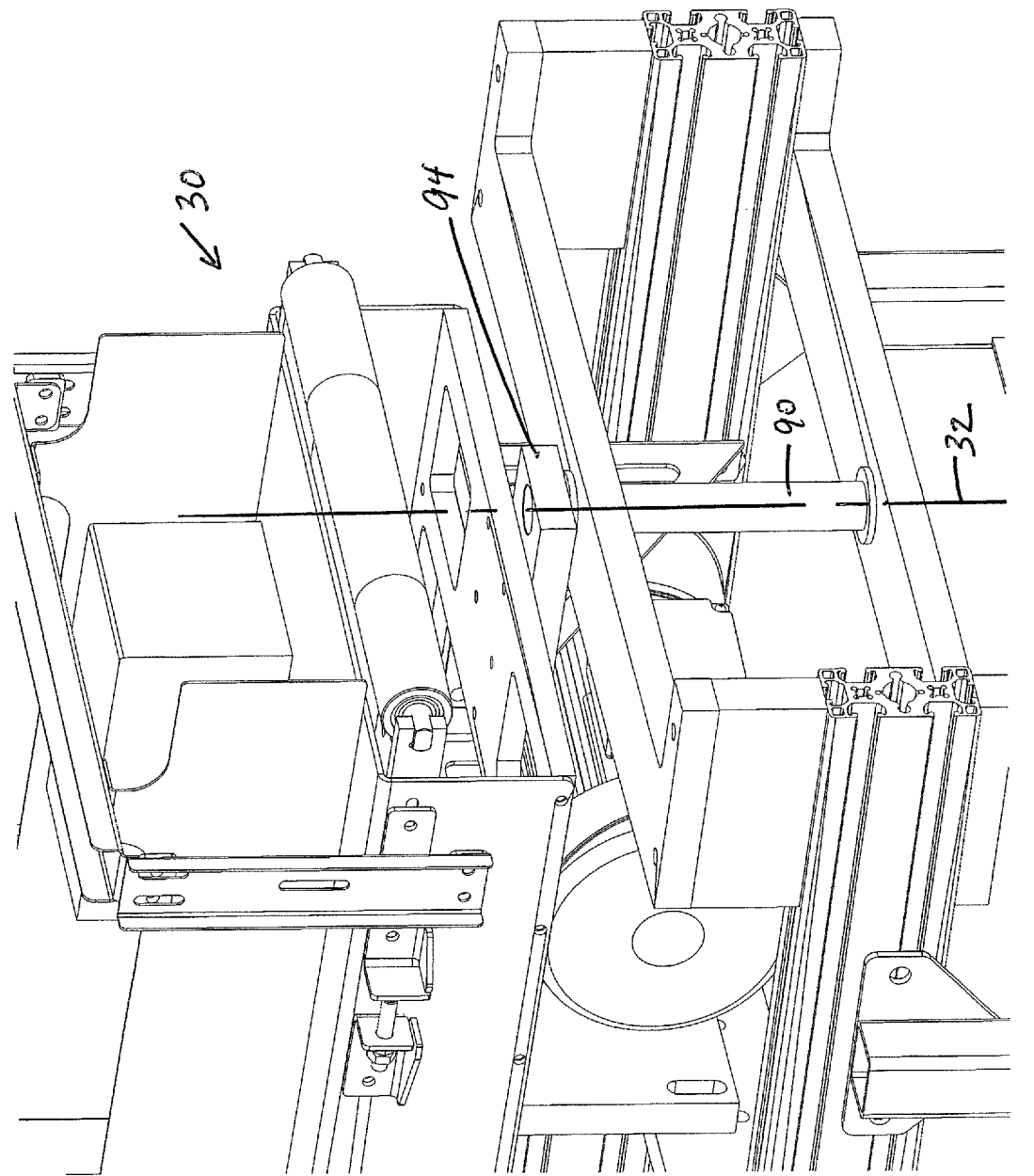

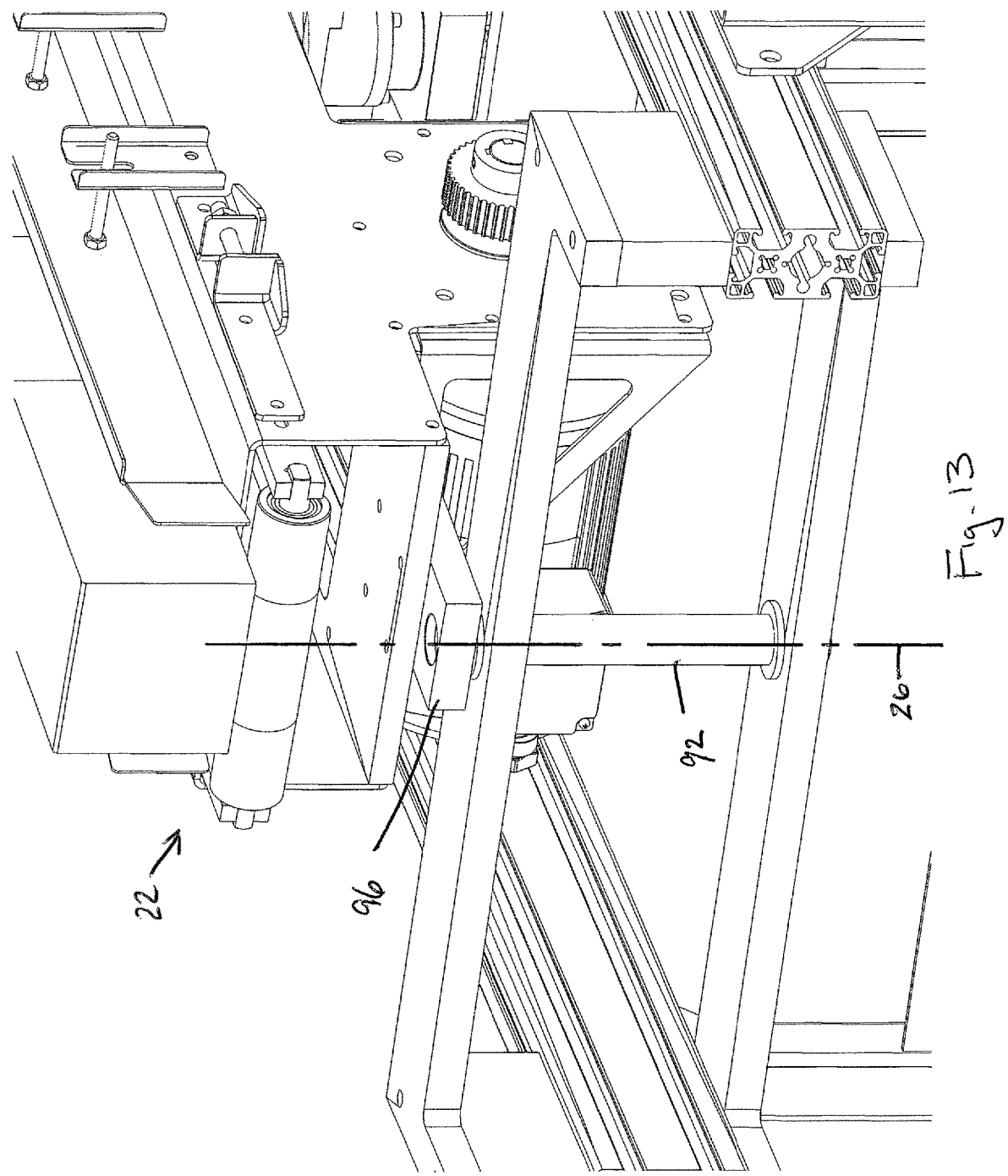

HIGH SPEED DIVERTER

TECHNICAL FIELD

This application relates generally to a system and method for diverting products, materials or other items/objects traveling along a conveyor and, more specifically, to high speed diversion of products from one conveying path into multiple conveying paths.

BACKGROUND

It is often necessary to sort objects being conveyed on a conveyor. The sorting may be necessitated by downstream events on demand or dynamically (such as too little or too much product at a subsequent station), by the need to separate objects based on their identity (which can be indicated by a bar code), for separation of objects based on their final destination, or for other reasons. Further, the objects may be conveyed in an irregular pattern, with irregular spacing or irregular product orientation. For any or all of these reasons, or for other reasons, it may be desirable to quickly divert objects traveling in one conveying path to another conveying path.

It would be desirable to provide a device to achieve high speed diversion without requiring an undesirably large footprint.

SUMMARY

In one aspect, a system for diverting objects traveling along a conveyor includes an upstream conveyor segment having an inlet end and an outlet end and a downstream conveyor segment having an inlet end and an outlet end. The inlet end of the downstream conveyor segment is located to receive items from the outlet end of the upstream conveyor segment. A conveyor shift mechanism is linked to both the outlet end of the upstream conveyor segment and the inlet end of the downstream conveyor segment for carrying out lateral movement of the outlet end of the upstream conveyor segment in one lateral direction while simultaneously carrying out lateral movement of the inlet end of the downstream conveyor segment in an opposite lateral direction.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 8-11 show partial bottom perspectives where the conveyor shift mechanism is associated with the outlet end of the upstream conveyor segment and the inlet end of the downstream conveyor segment;

FIG. 12 is a partial perspective showing the pivot arrangement of the outlet end of the downstream conveyor segment;

FIG. 13 is a partial perspective showing the pivot arrangement of the inlet end of the upstream conveyor segment;

DETAILED DESCRIPTION

Figure 1:
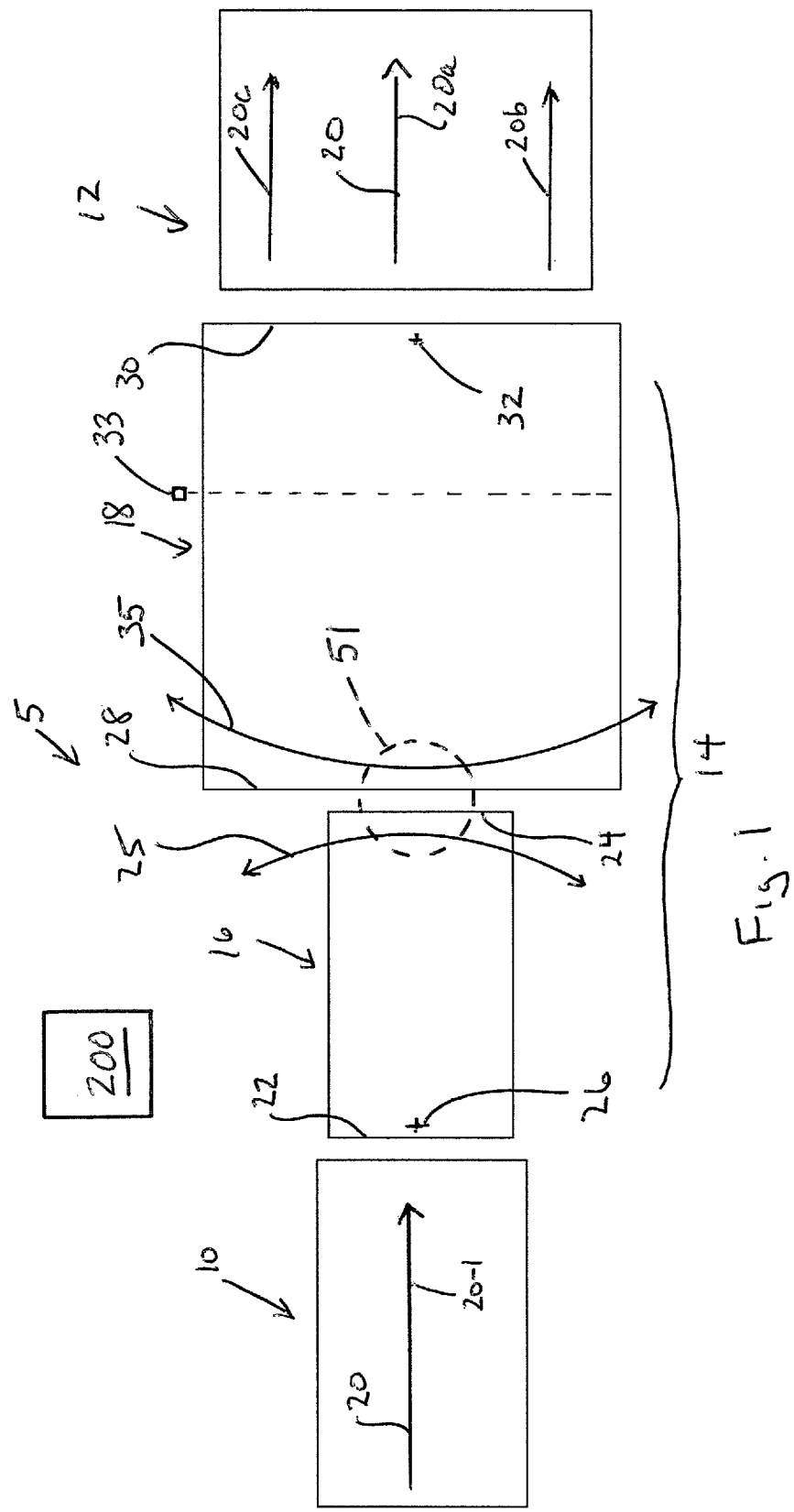
FIGS. 1-3 are schematic top plan views of a conveyor with a diverting system.

Referring to FIG. 1, top plan schematic view of a conveyor 5 with a diverting system is shown and includes an infeed conveyor 10, an outfeed conveyor 12 and a diverting system 14 that includes an upstream conveyor segment 16 and a downstream conveyor segment 18. Here, infeed and outfeed conveyors 10 and 12 may have fixed positions, with the feed direction along the conveyor 5 generally shown by arrows 20.

Upstream conveyor segment 16 includes an inlet end 22 and an outlet end 24, and is pivotable about a pivot axis 26 (running in and out of the page) that is proximate the inlet end 22, as reflected by pivot path 25. Downstream conveyor segment 18 includes an inlet end 28 and an outlet end 30, and is pivotable about a pivot axis 32 (running in an out of the page) that is proximate the outlet end 30, as reflected by pivot path 35. Pivoting of the conveyor segments causes material lateral shifting of the outlet end 24 and inlet end 38, but without significant lateral shifting of inlet end 22 or outlet end 30. The pivoting movement of the upstream conveyor segment 16 and the downstream conveyor segment 18 is linked so that lateral or pivotal movement of the outlet end 24 in one direction will occur simultaneously with lateral or pivotal movement of the inlet end 28 in an opposite direction. By coordinating the pivot movement with product throughput it is possible to, for example, divert product traveling in a single conveyance path 20-1 along infeed conveyor 10 into multiple conveyance paths 20a, 20b, 20c along outfeed conveyor 12.

Figure 2:
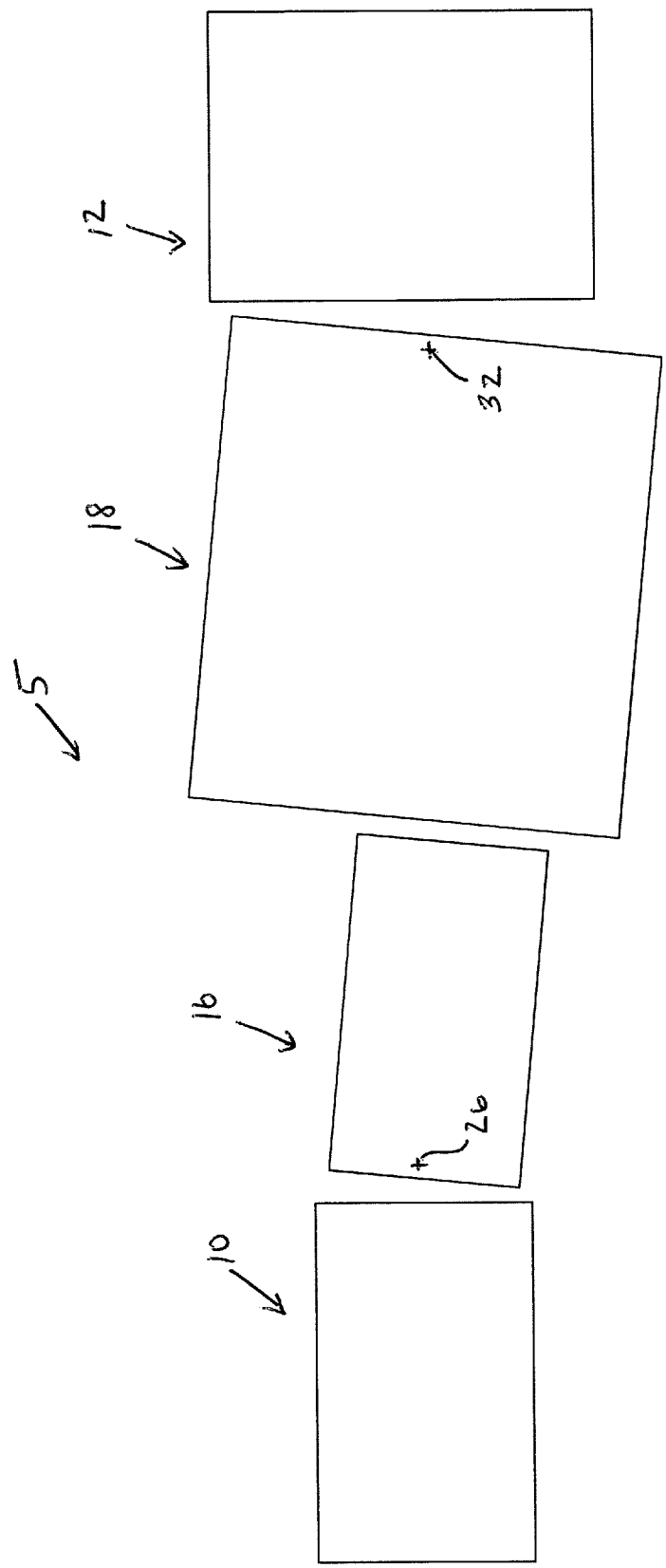
Figure 3:
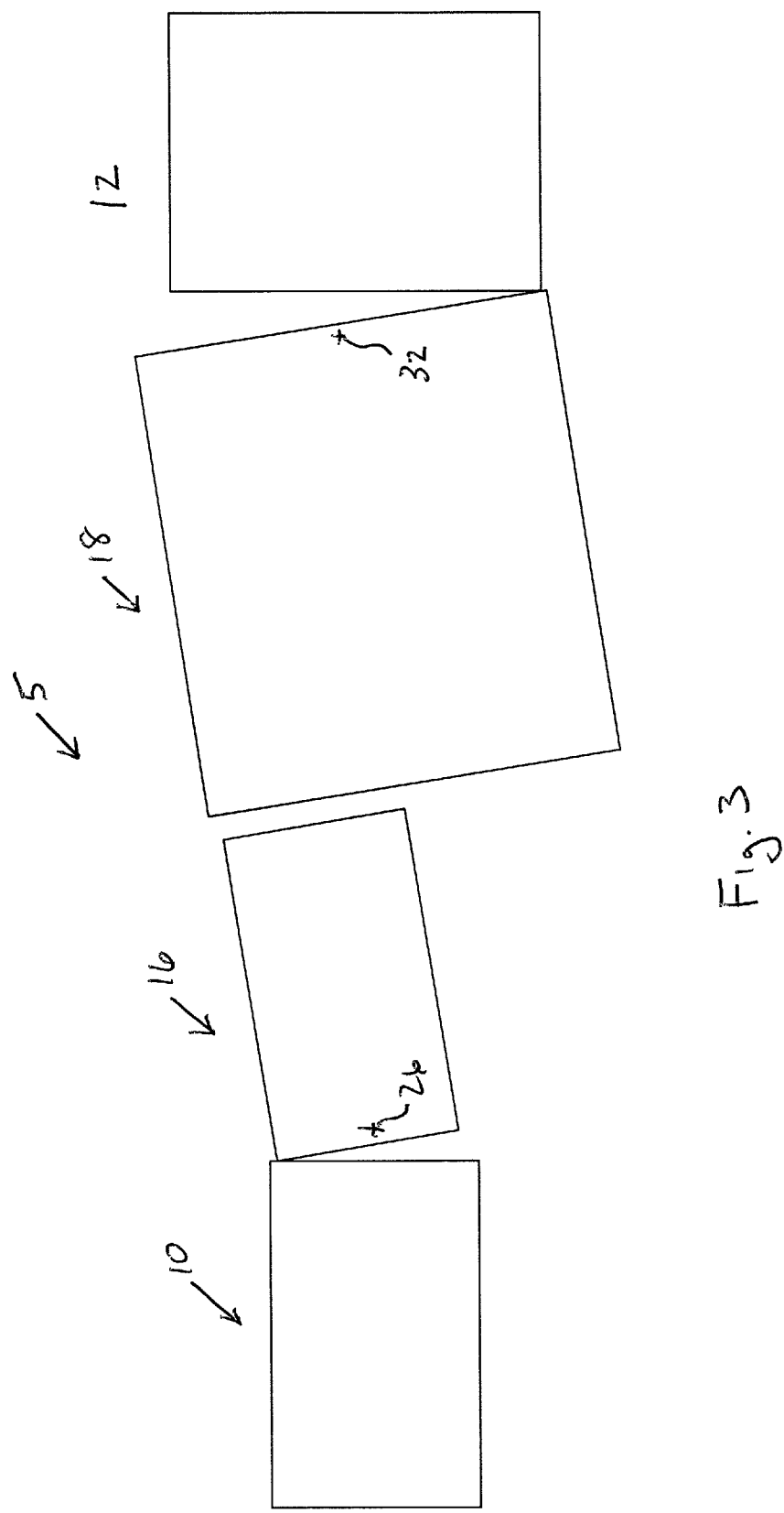
Figure 4:
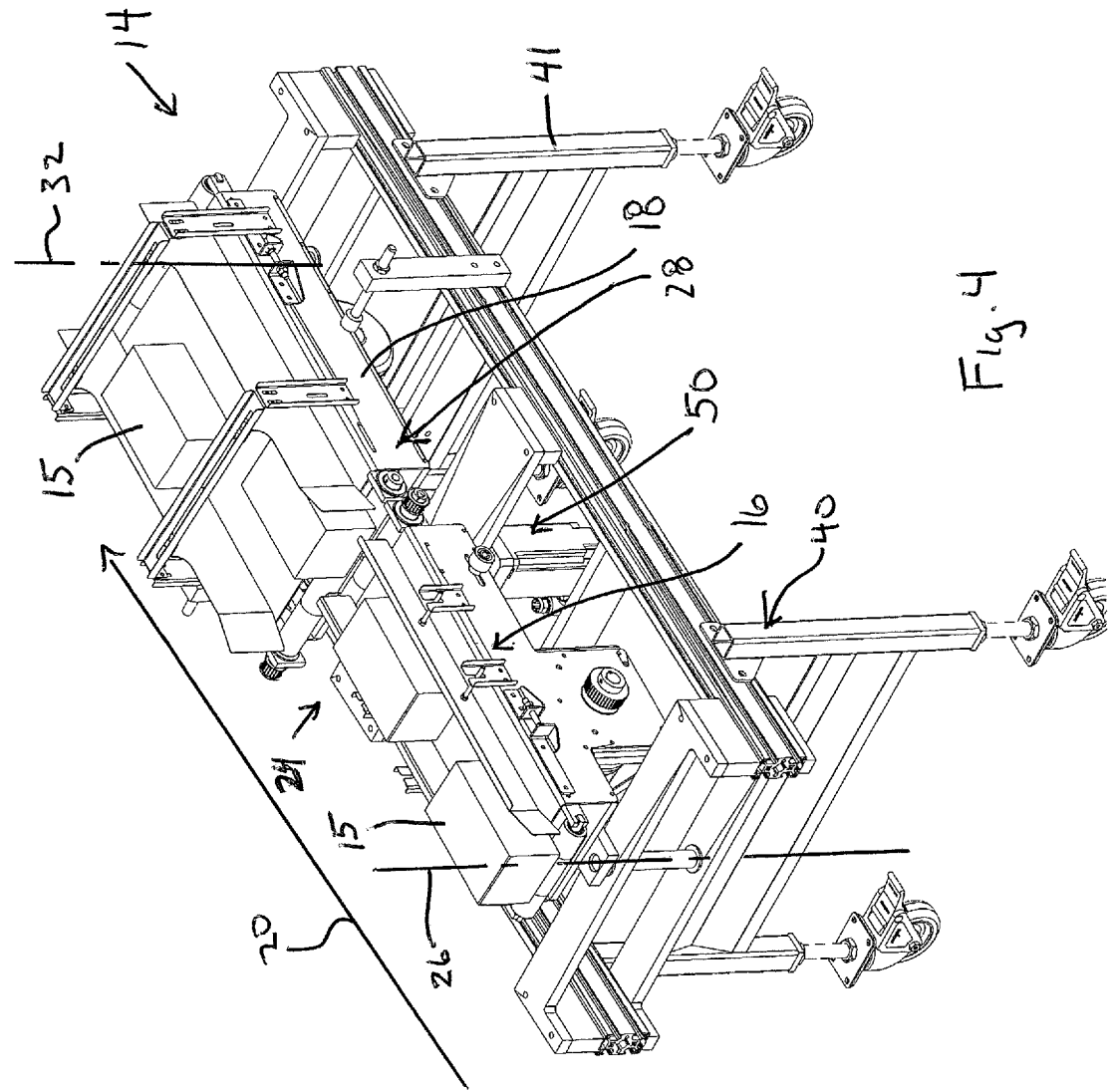
FIG. 4 shows a perspective view of one embodiment of a diverting system.

Referring to FIGS. 2 and 3, the two exemplary, extreme pivot positions of the conveyor segments 16 and 18 are shown.

Referring now to FIGS. 4-13, one embodiment of the diverting system 14 for objects 15 (e.g., boxes) is shown, where upstream conveyor 16 and downstream conveyor 18 are both mounted to a common frame 40 for pivot about respective axes 26 and 32. Here the frame 40 includes wheeled support legs 41 enabling ready movement of the system 14 into desired position along a conveyor path, but other variations are possible.

A conveyor shift mechanism 50 is linked to both the outlet end 24 of the upstream conveyor segment and the inlet end 28 of the downstream conveyor segment for carrying out lateral movement of the outlet end of the upstream conveyor segment in one lateral direction while simultaneously carrying out lateral movement of the inlet end of the downstream (in this case by pivoting) conveyor segment in an opposite lateral direction (in this case also by pivoting). Here, the conveyor shift mechanism 50 includes a rotatable arm 52 having one side (here an end) 54 linked to the outlet end 24 of the upstream conveyor segment 16 and an opposite side (here an end) 56 linked to the inlet end 28 of the downstream conveyor segment. Arm end 54 includes a transfer link 58 that rides within a guide slot 60 of outlet end 24, and arm end 56 includes a transfer link 62 that rides within a guide slot 64 of the inlet end 28. The transfer links 58, 62 may be formed, for example, by pin members. The pin members may be rotatably mounted to the ends of the arm 52 so that the pin members rotate during movement within the guide slots, which facilitates movement of the pin members along the guide slots. However, variations in which the pin members do not rotate, and simply slide, are also viable and contemplated herein.

Here, the guide slots 60 and 64 are fixed at an underside of the outlet end 24 and inlet end 28 respectively, and may, for example, be formed by spaced apart side rails or bars. Both illustrated guide slots are linear. However, variations in structure and shape of the guide slots are possible.

The conveyor shift mechanism 50 includes a motor 70 connected to selectively rotate the arm 52. The motor 70 includes an output shaft operatively connected to the arm between the arm ends 54 and 56. The connection may be direct, or through an intermediate component such as a gear etc. The motor has a substantially vertical output shaft axis (e.g., 72) that passes through a central portion of the arm 52. The motor is rotated in one direction to move the diverting system toward the extreme position of FIG. 2, and the motor is rotated in the opposite direction to move the diverting system toward the extreme position of FIG. 3. For this purpose, the controller 200 may be configured to effect rotation of the motor by a set amount (e.g., set degrees of rotation) that will cause rotation of the arm so as to define the extreme positions of the conveyor segments. The controller may also effect rotation of the motor by other set amounts designed to achieve corresponding specific relative positions of the conveyor segments between the two extreme positions. During a typical operation in which one lane of products is to be diverted into multiple lanes of product (or visa versa) the 52 will be rotated repeatedly back and forth.

Notably, the illustrated configuration provides a drive arrangement for the rotatable arm 52, where the entire footprint 51 of the drive and arm is located entirely within a lateral movement footprint of at least the larger one of the outlet end 24 of the upstream conveyor segment or the inlet end 28 of the downstream conveyor segment, or in some cases within both footprints. Other drive arrangements are possible, such as, for example, a linear actuator where the arm 52 has a fixed pivot axis and the linear actuator pivotably connects to the arm at a location offset from the pivot axis.

Figure 5:
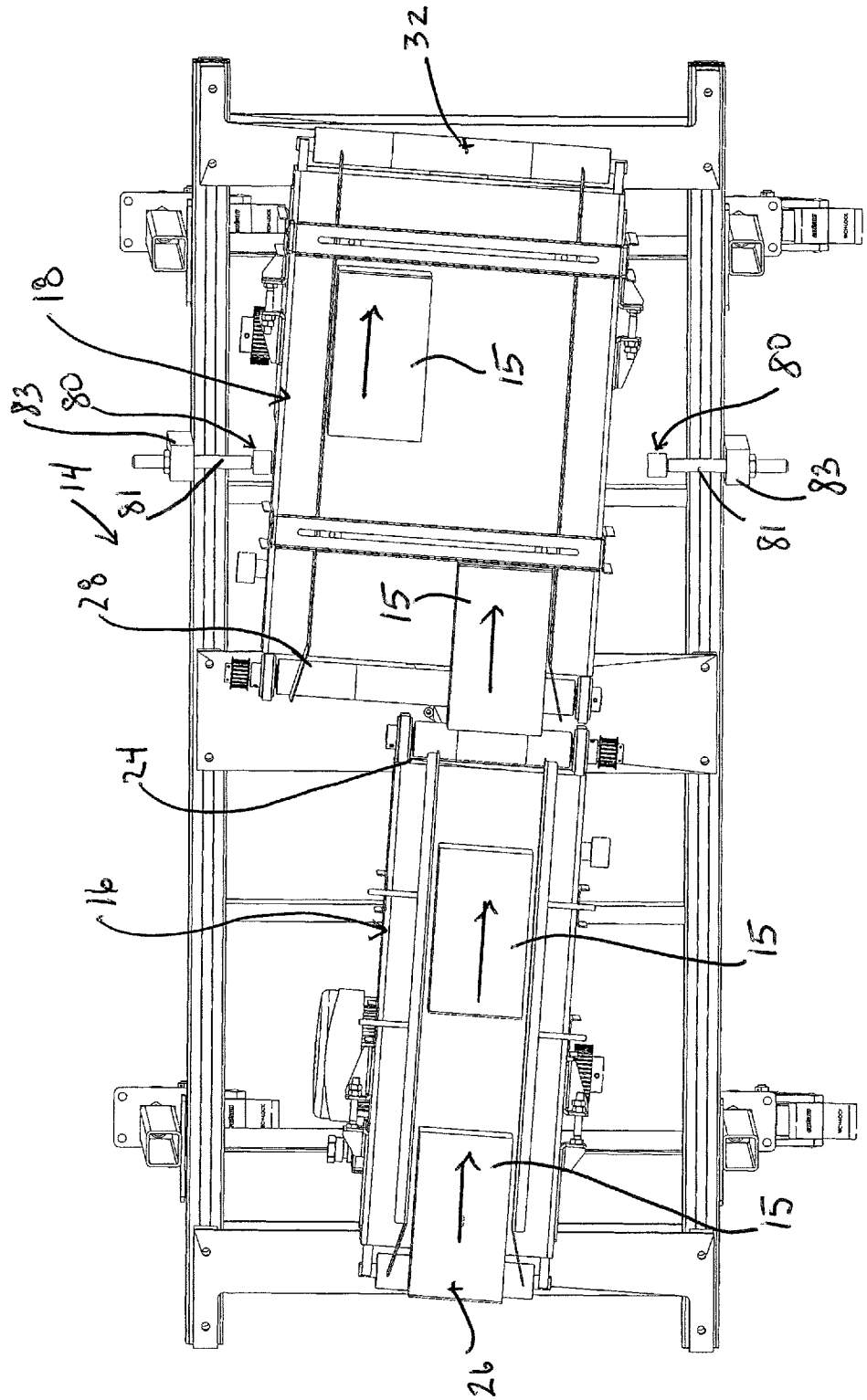
FIG. 5 shows a top view of the diverting system of FIG. 4.
Figure 6:
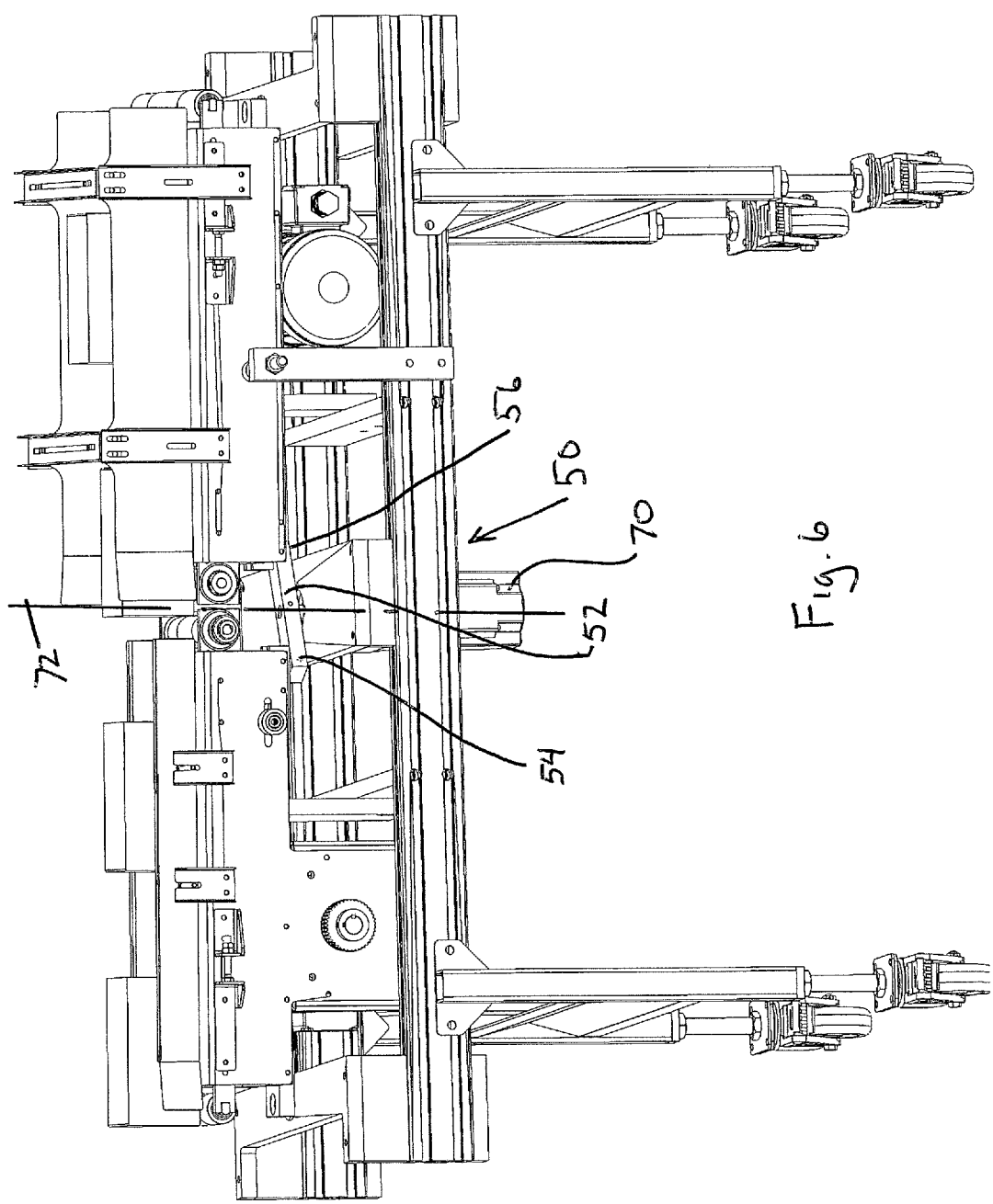
FIG. 6 shows a side perspective of the diverting system.
Figure 7:
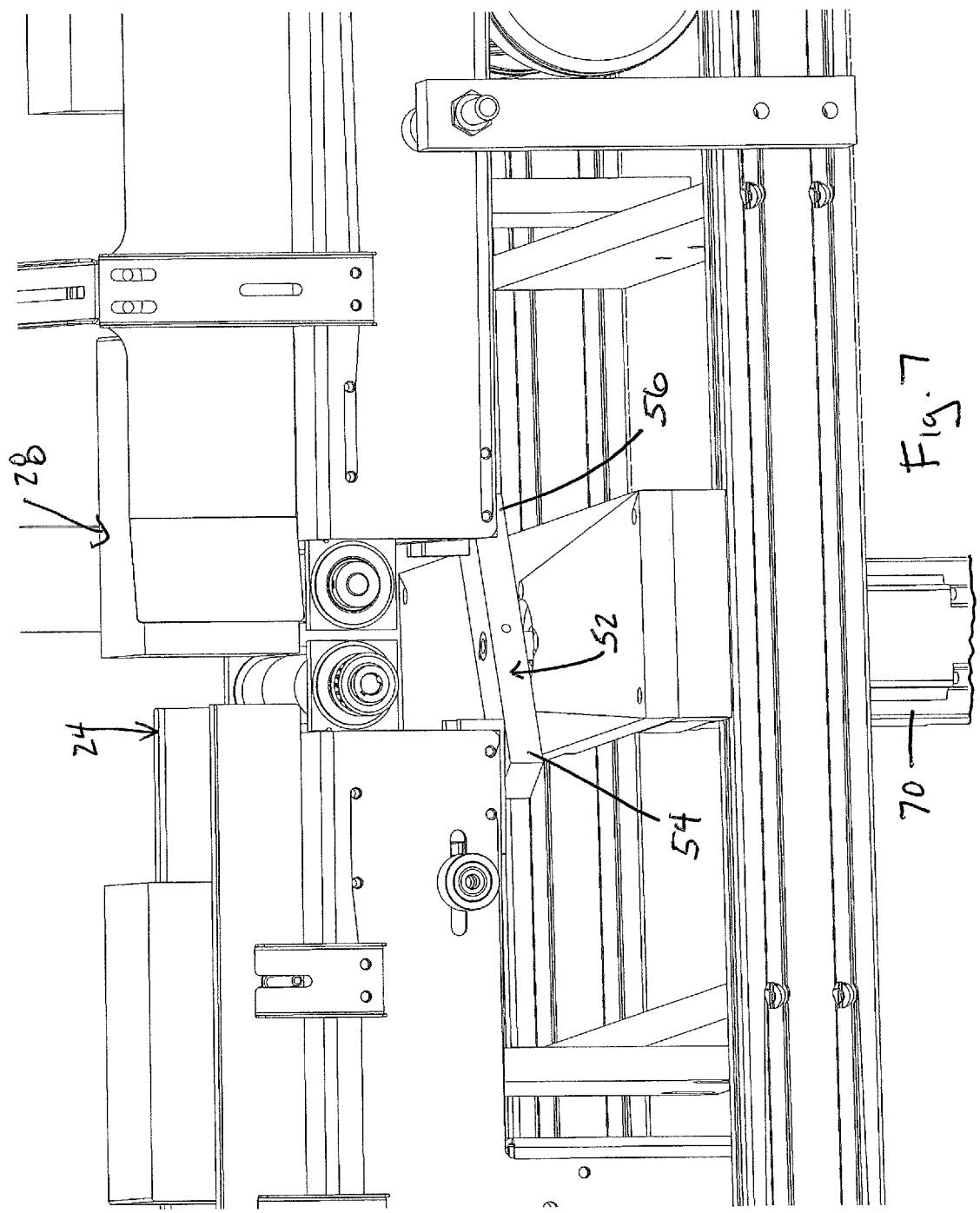
FIG. 7 shows a partial perspective of where the outlet end of the upstream conveyor segment is adjacent the inlet end of the downstream conveyor segment.
Figure 8:
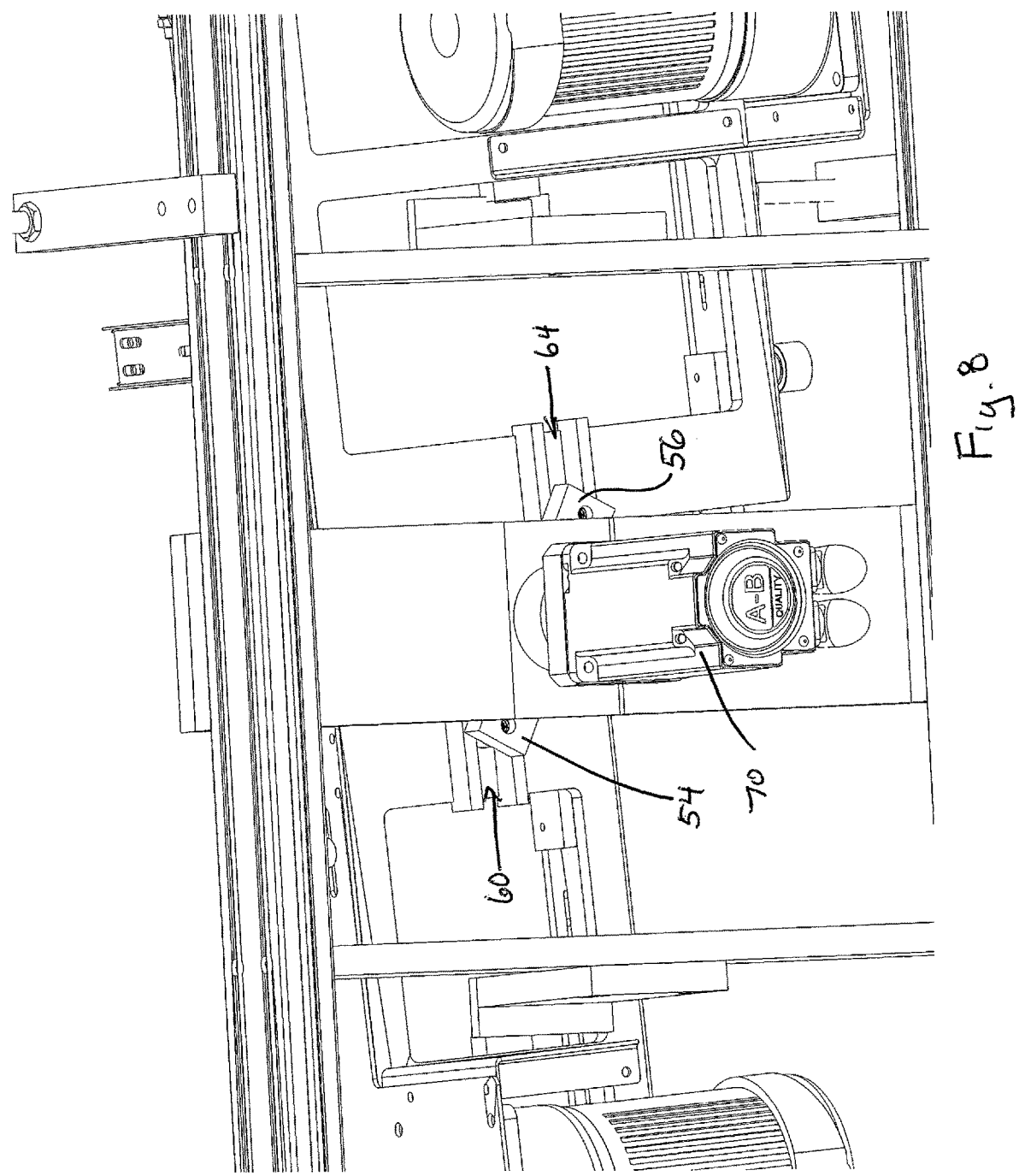
Figure 9:
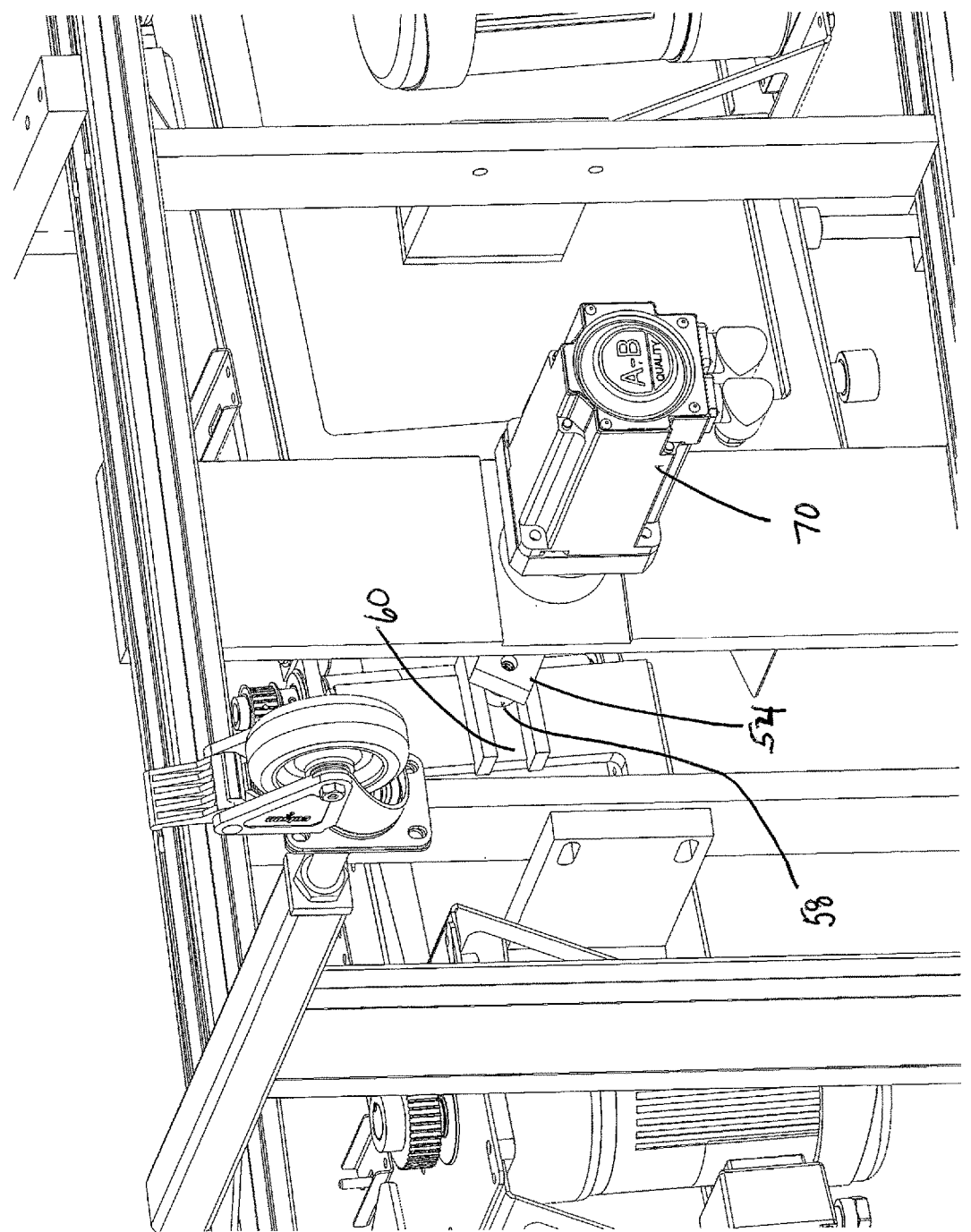
Figure 10:
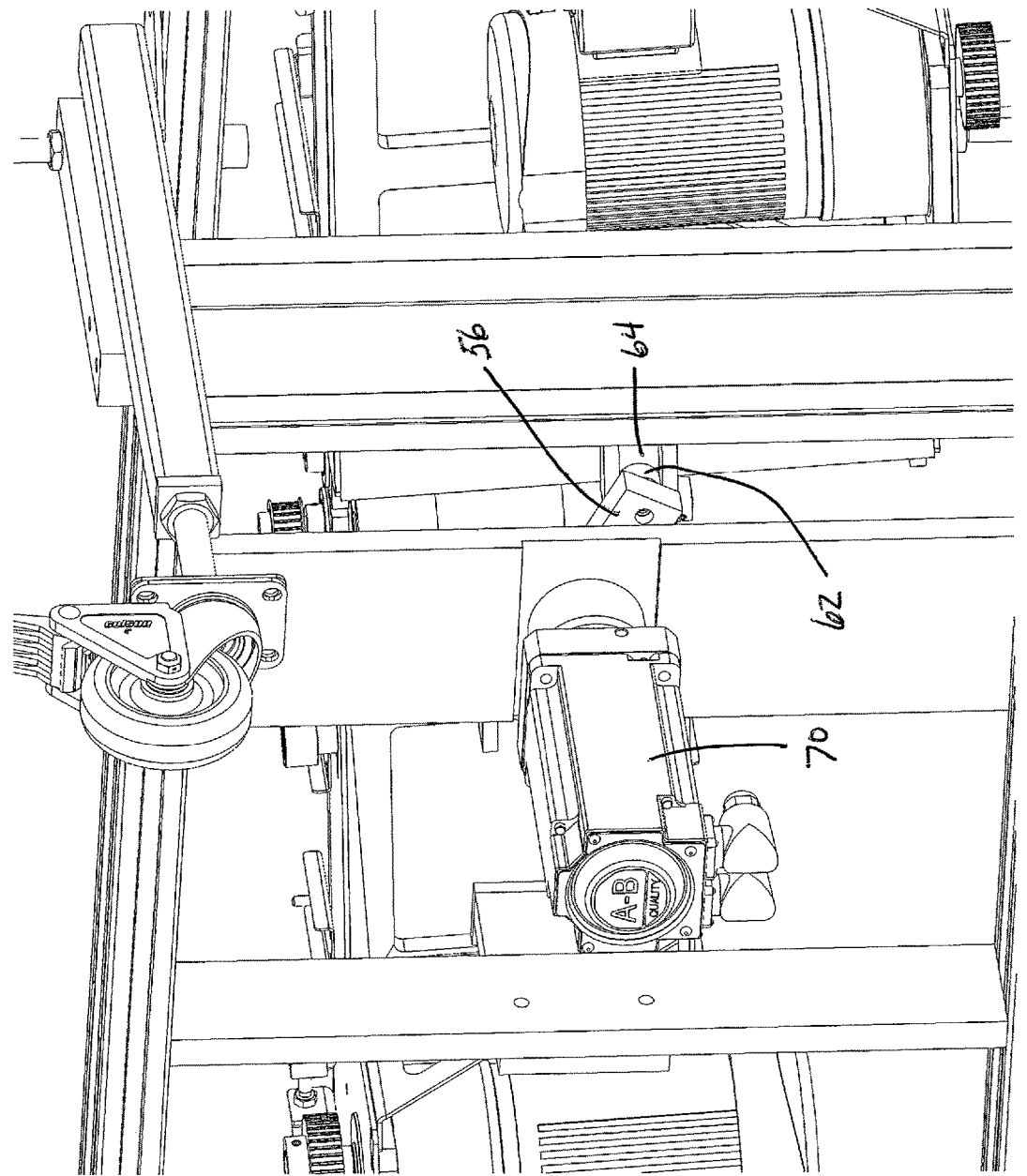
Figure 14A:
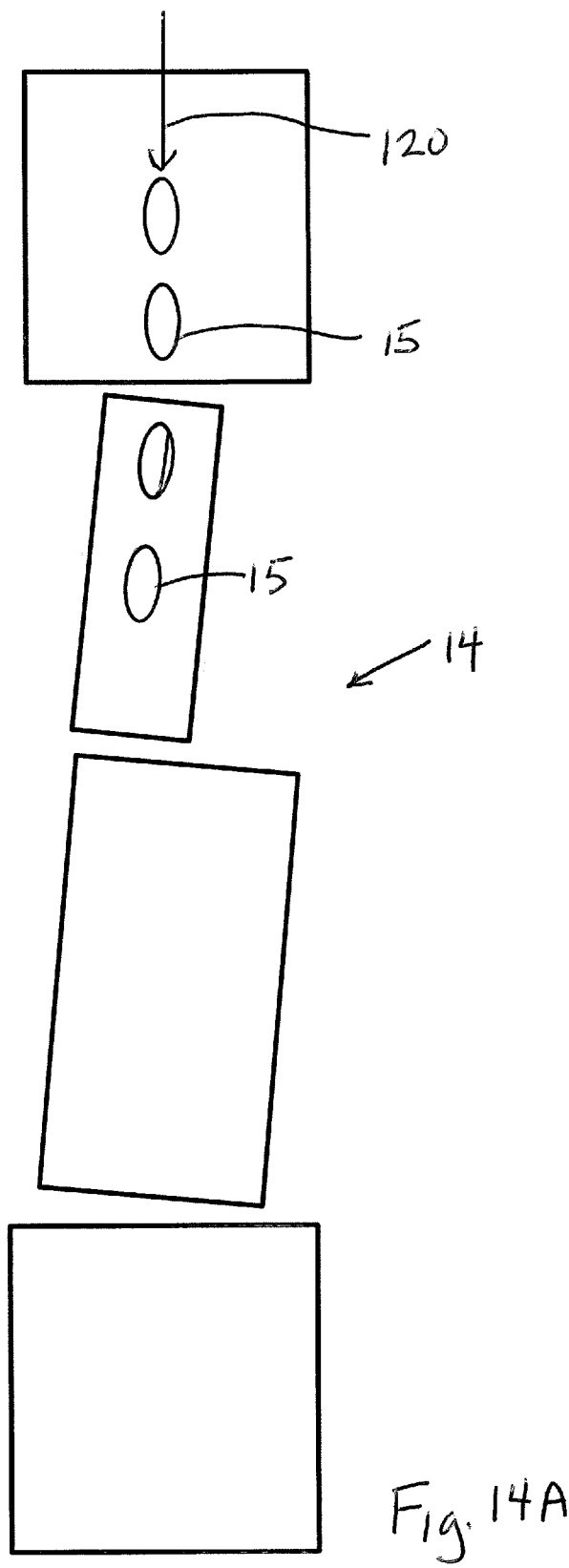
FIGS. 14A-14E depict a diverting system operating to divert objects traveling on one conveyance path on an infeed conveyor into two conveyance paths on an outfeed conveyor.
Figure 14B:
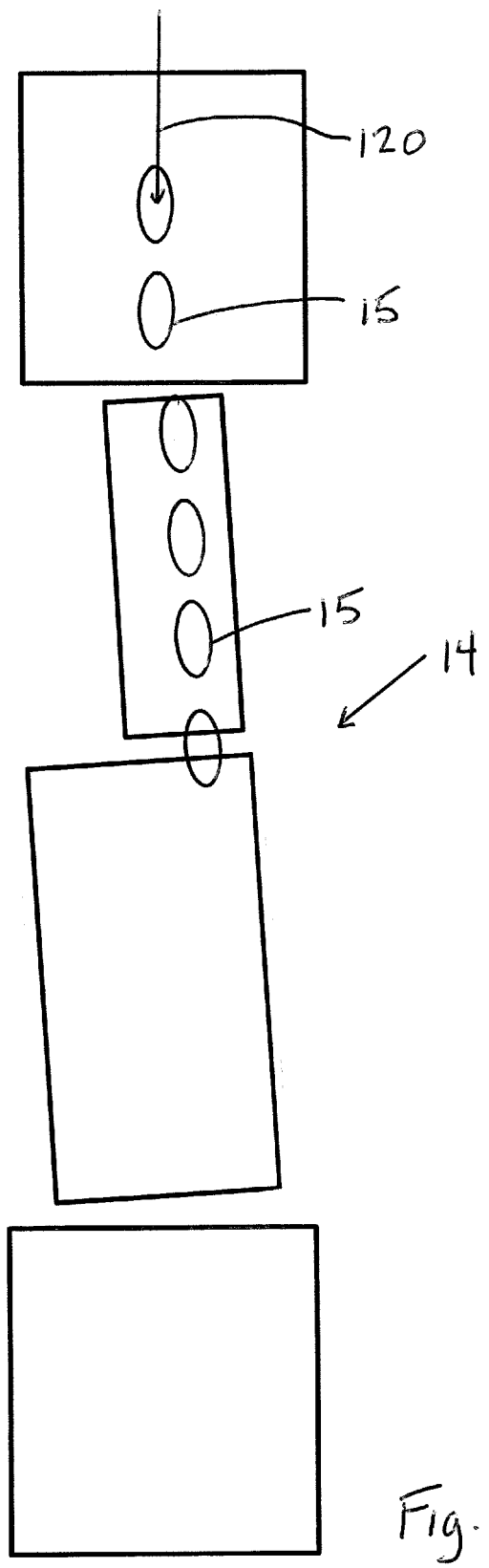
Figure 14C:
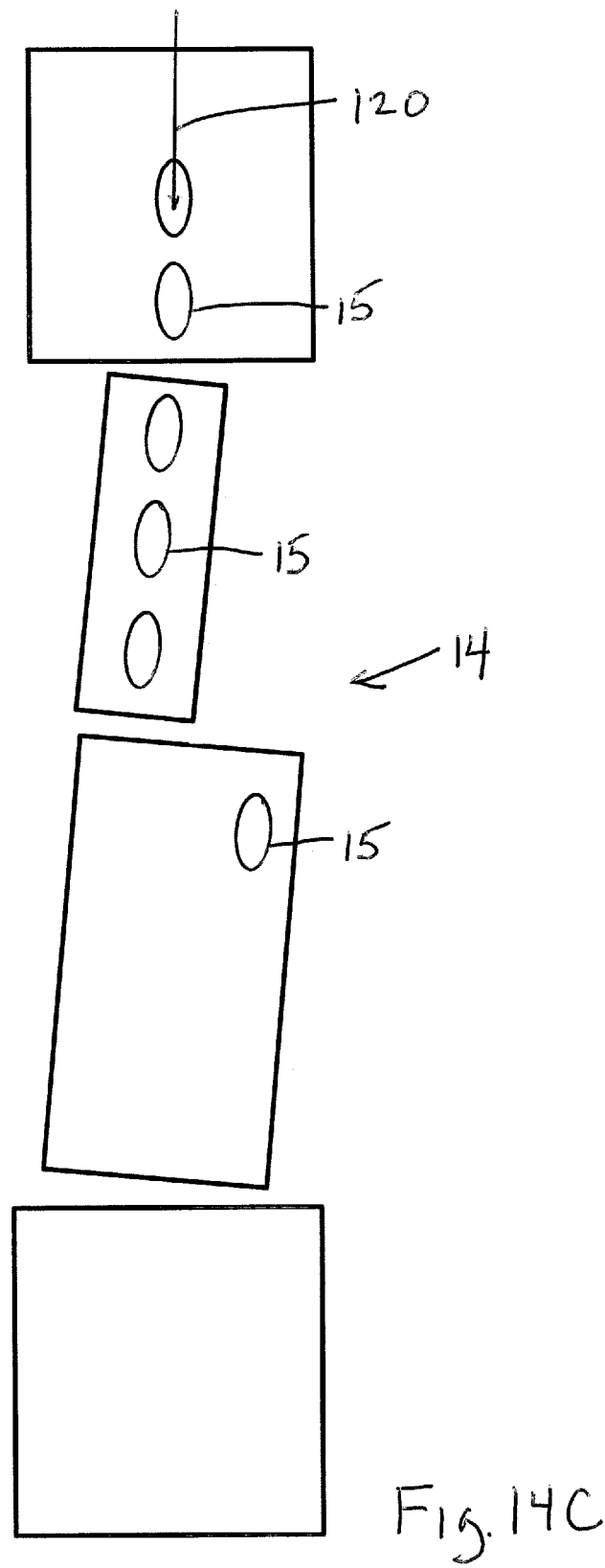
Figure 14D:
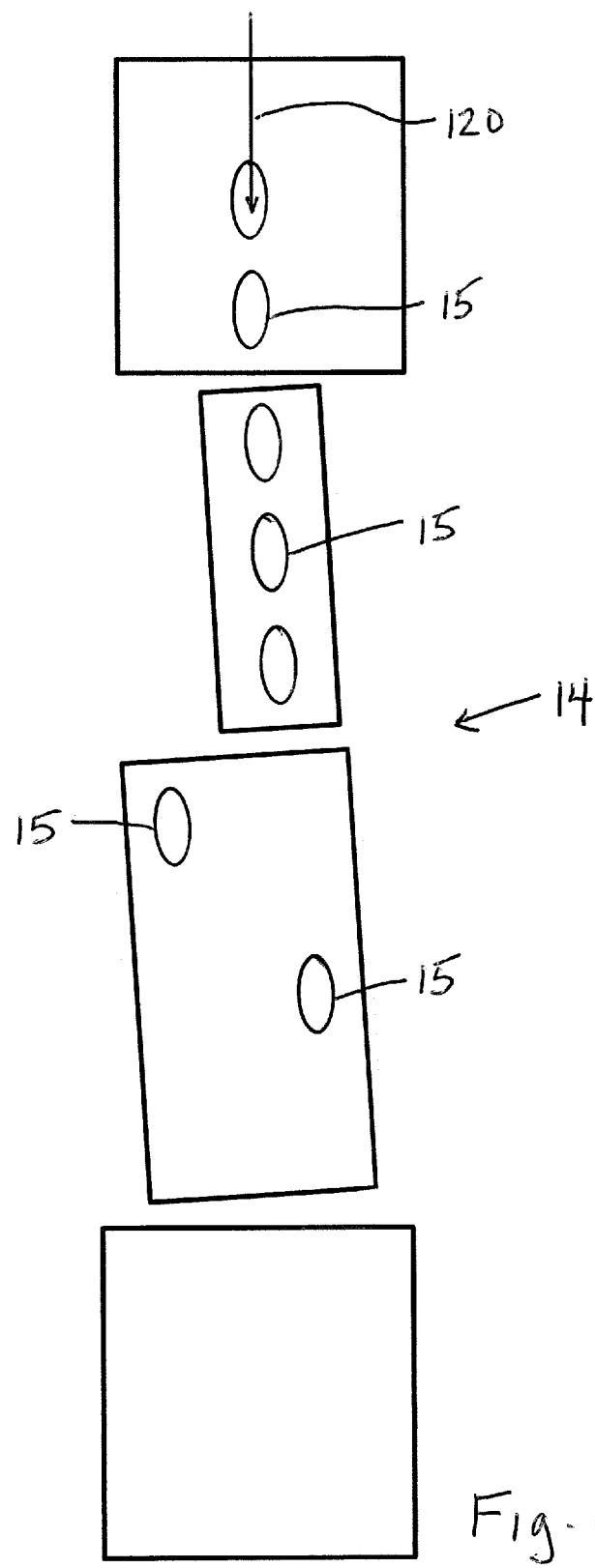
Figure 14E:
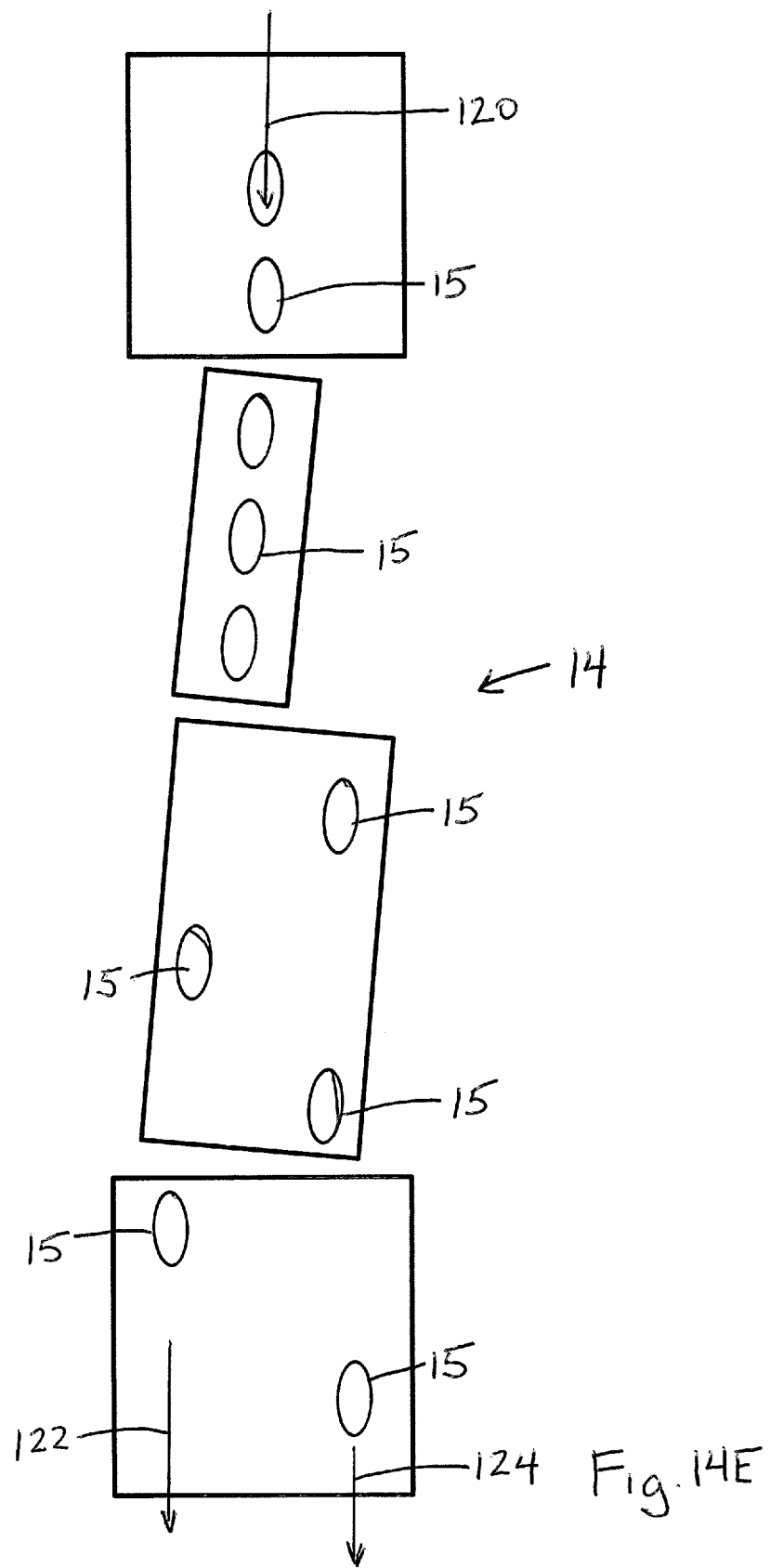
Figure 15A:
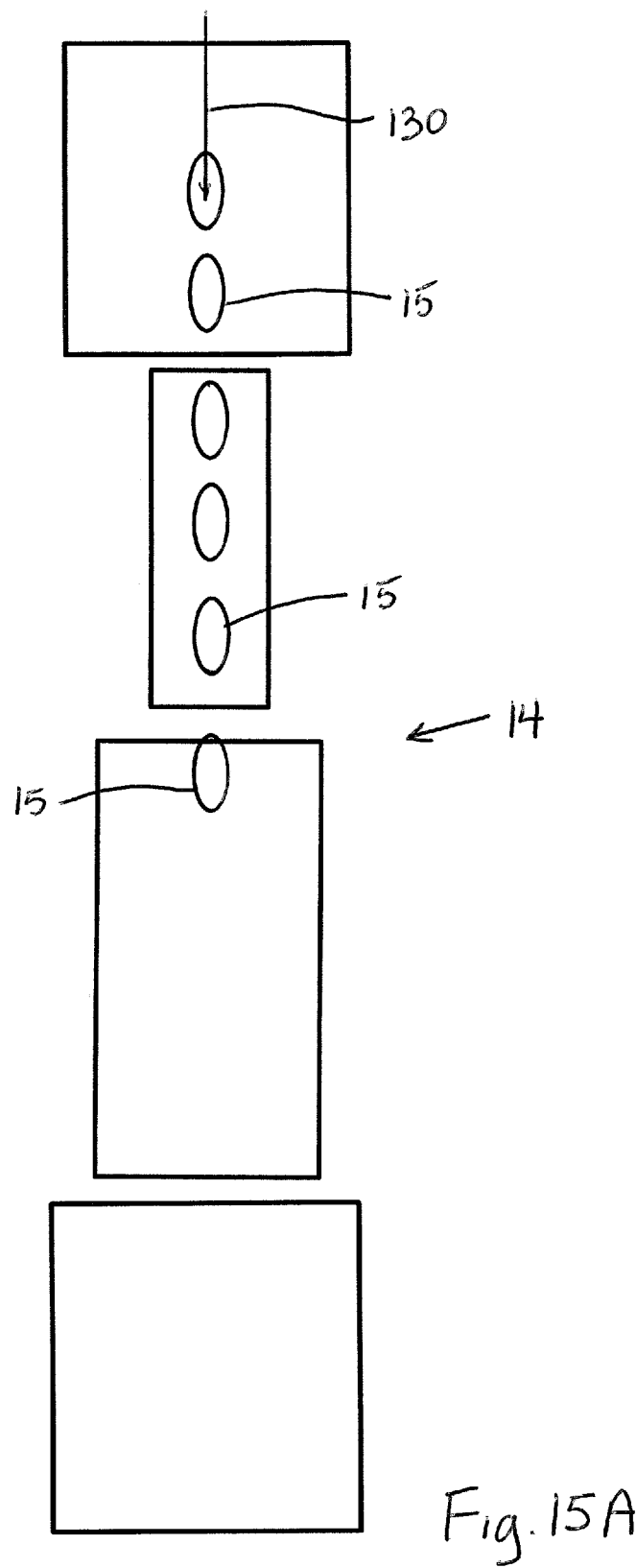
FIGS. 15A-15G depict a diverting system operating to divert objects traveling on one conveyance path on an infeed conveyor into three conveyance paths on an outfeed conveyor.
Figure 15B:
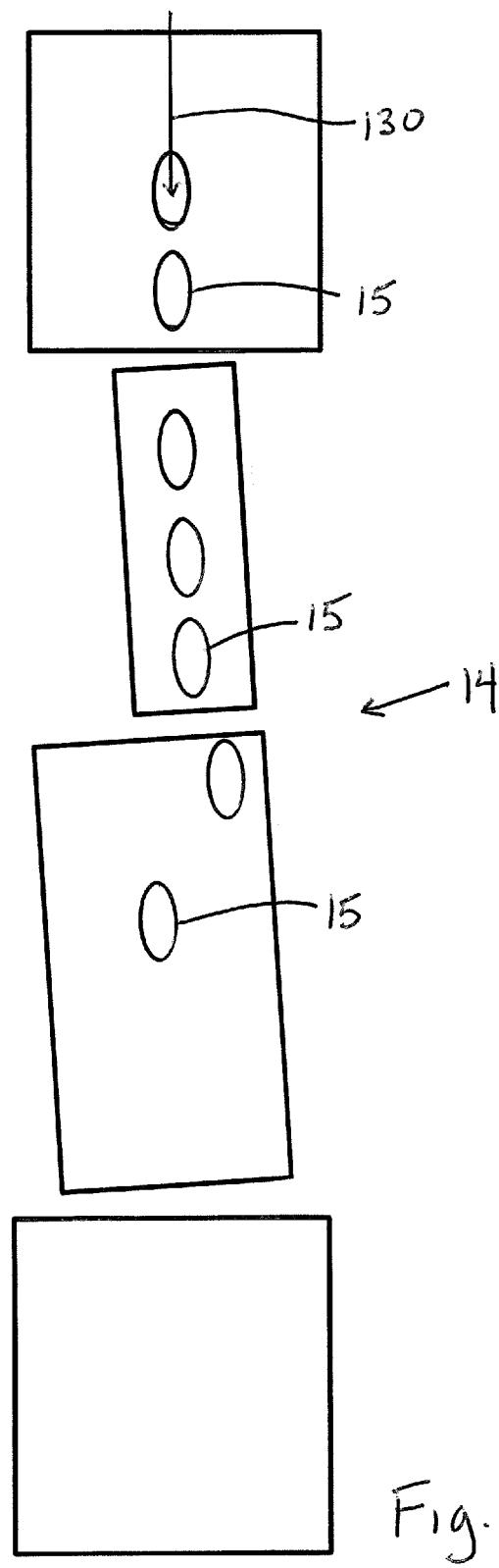
Figure 15C:
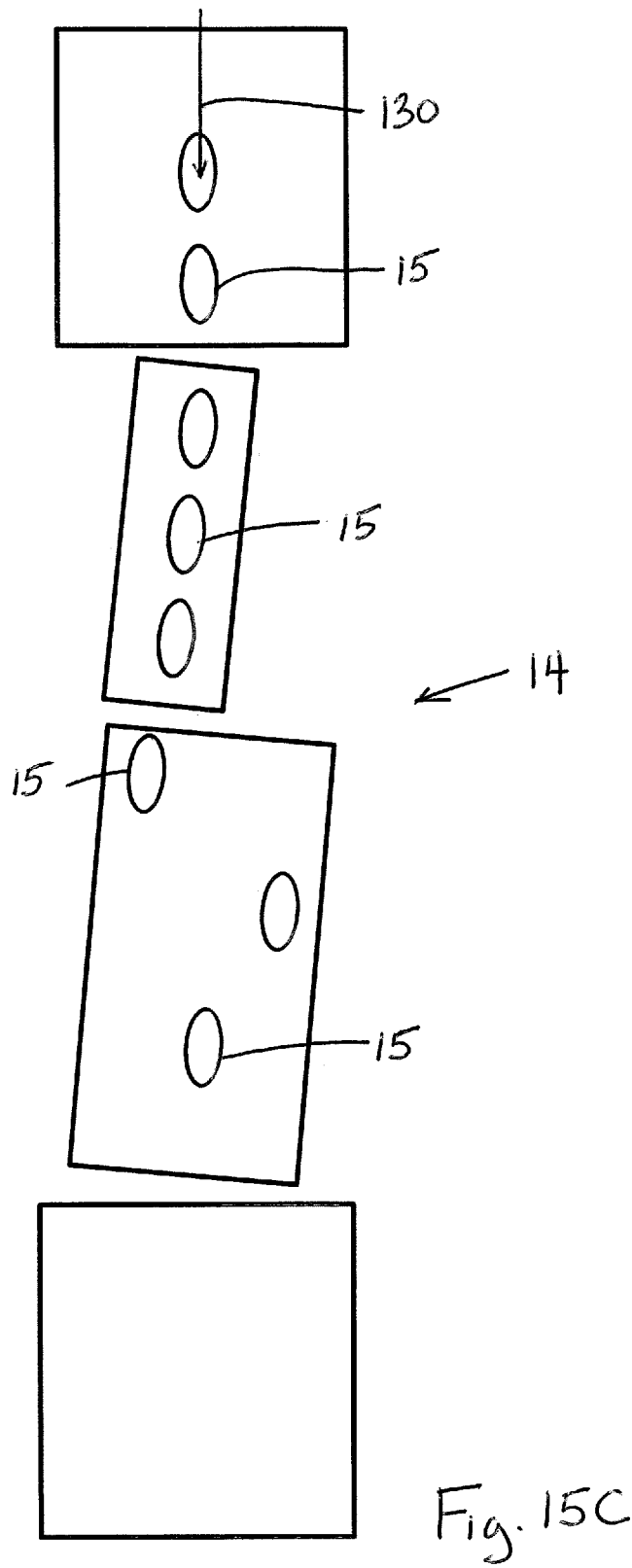
Figure 15D:
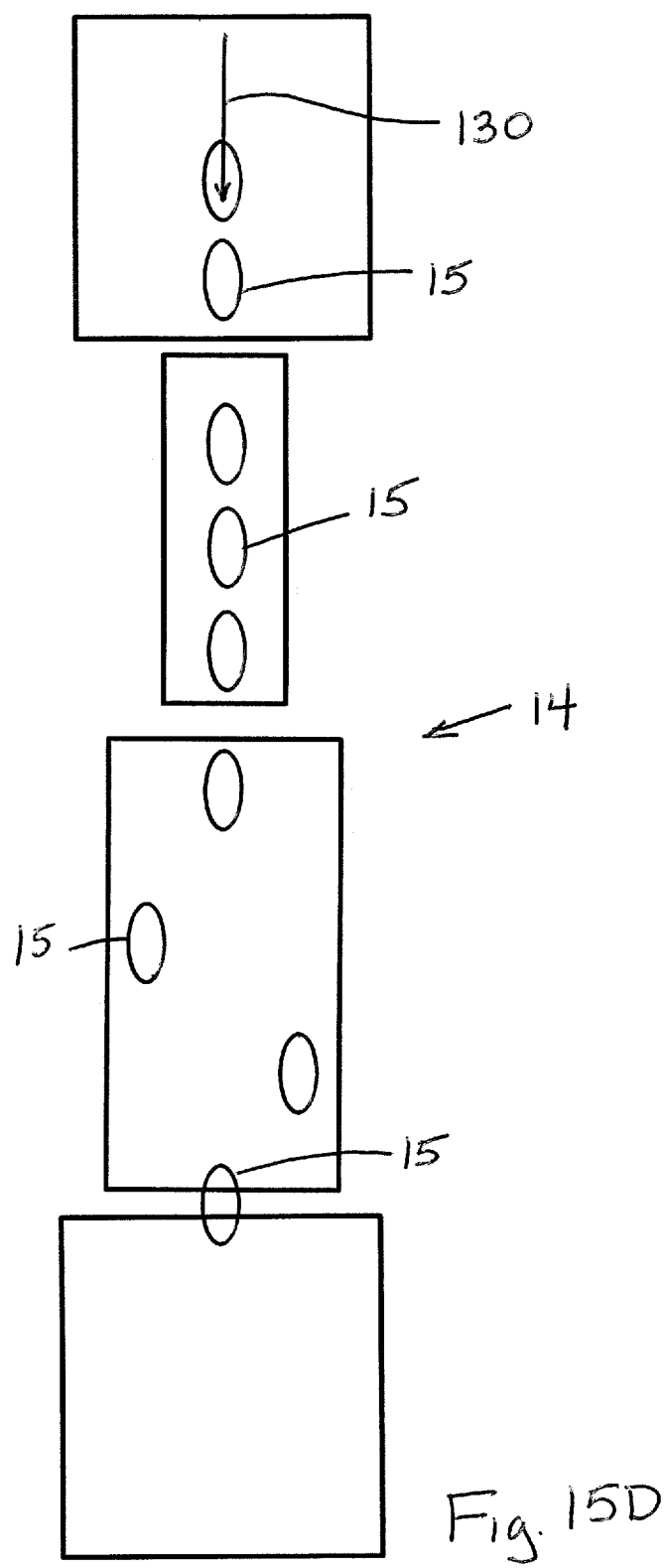
Figure 15E:
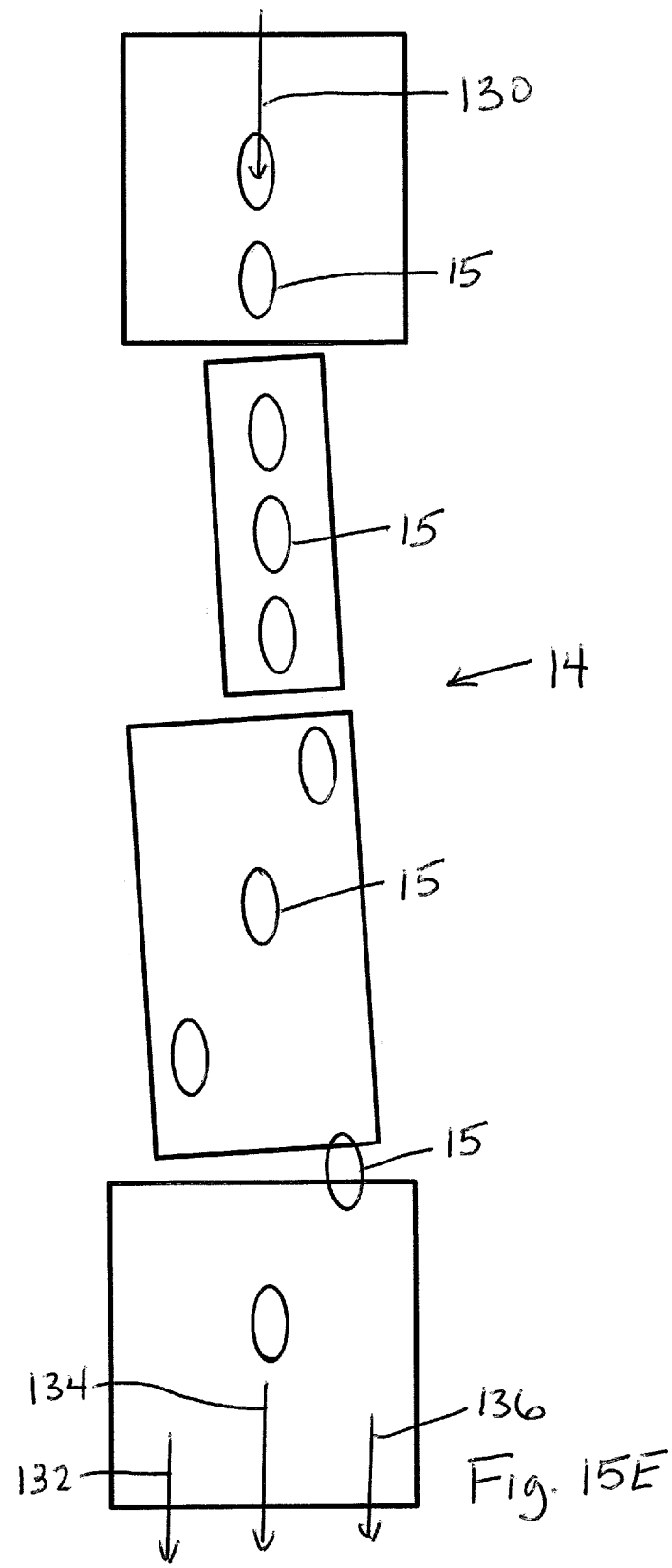
Figure 15F:
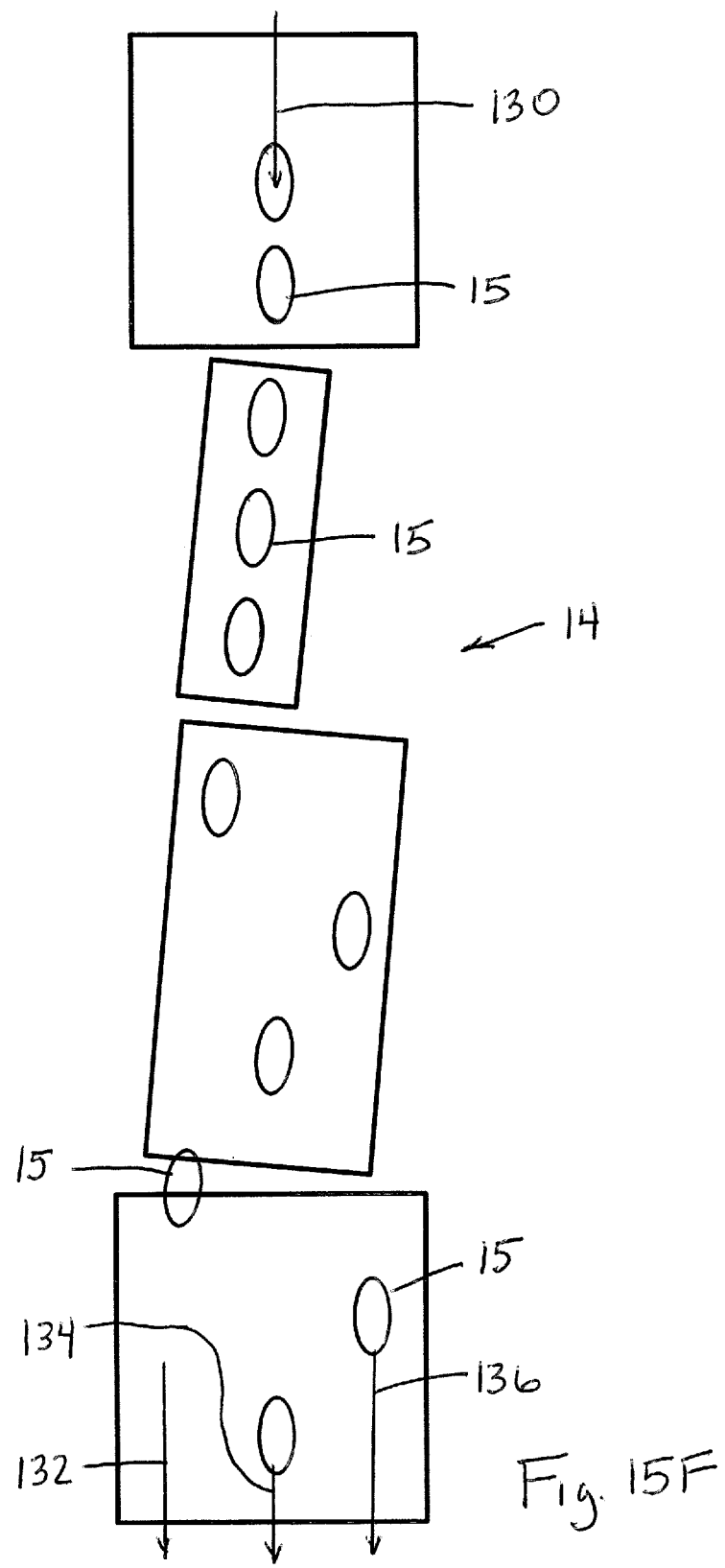
Figure 15G:
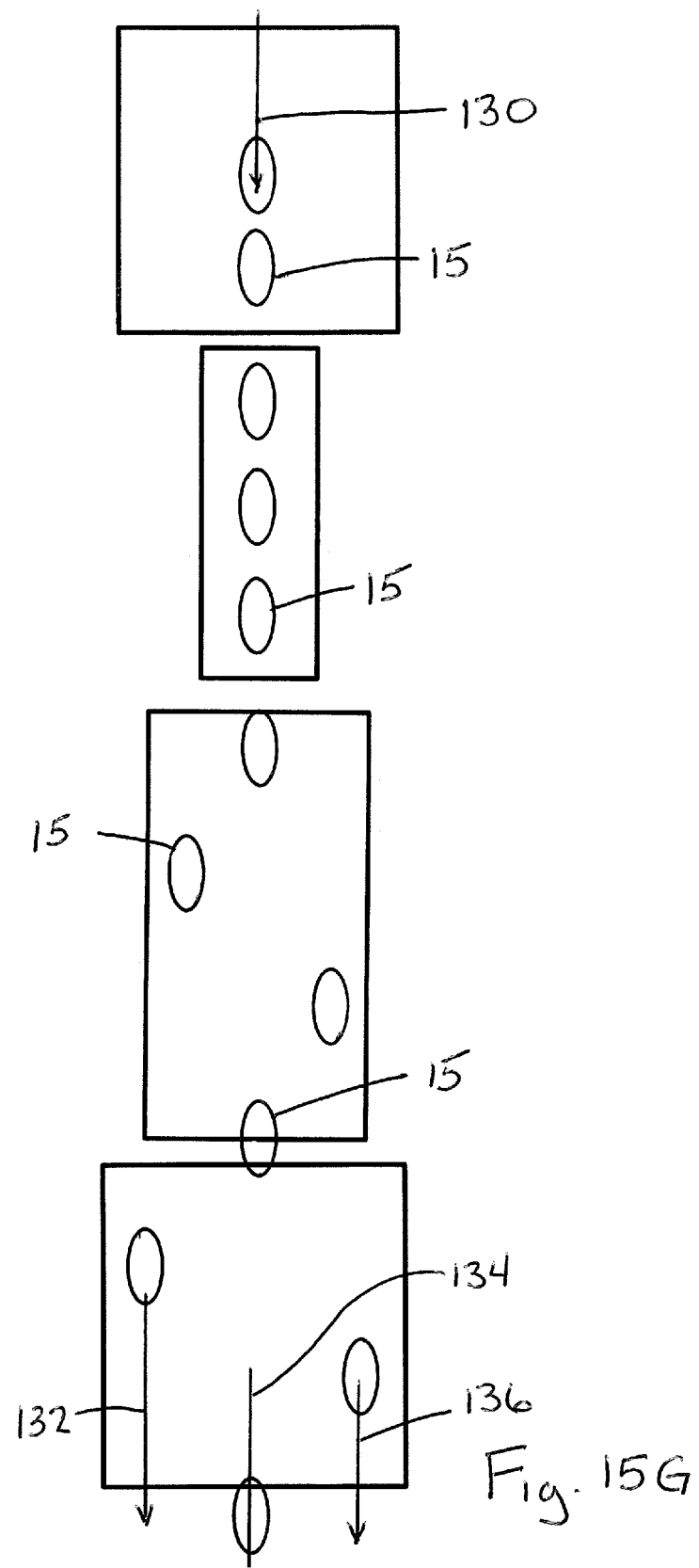

As best seen in FIG. 5, stops 80 are positioned at the sides of downstream conveyor segment 18 to contact respective side portions of the downstream conveyor segment 18 to act as a limit on pivot of conveyor segment 18, and likewise a limit on pivot of upstream conveyor segment 16 due to the link between the two. Thus, lateral shifting of both the outlet end 24 of the upstream conveyor segment and the inlet end 28 of the downstream conveyor segment is limited by the stops 80. The lateral position of the stops may be adjustable (e.g., where threaded shafts 81 are movable by rotation along threaded openings in shaft support blocks 83).

FIGS. 12 and 13 show the pivot arrangements of the outlet end 30 of downstream conveyor segment 18 and the inlet end 22 of the upstream conveyor segment 16. Here both arrangements include a respective pivot shaft 90, 92 connected by a respective pivot plate 94, 96 to an underside of the frame of the conveyor segment.

The images of FIG. 14A-14E depict one arrangement of a diverting system 14 operating to divert objects 15 traveling on one conveyance path 120 on an infeed conveyor alternatingly into two conveyance paths 122, 124 on an outfeed conveyor.

The images of FIG. 15A-15G depict another arrangement of a diverting system 14 operating to diver objects 15 traveling on one conveyance path 130 on an infeed conveyor into three conveyance paths 132, 134, 136 on an outfeed conveyor.

The conveyor 5 may include one or more product sensors etc. to provide inputs to a controller 200 of the diverting system 14 in order to properly time the shifting of the conveyor segments 14 and 16. For example, in one embodiment the system may employ a product detect sensor 33 located along conveyor segment 18 (or some other part of the conveyor system) that detects moving product, with the controller 200 implementing a slight dwell (e.g., a set delay or a delay determined by time between one product triggering the sensor and another product triggering the sensor) between the triggering of the product detect sensor and triggering of the servo motor to rotate the conveyor segments 14 and 16. Exemplary sensor types include photoelectric sensors, metallic proximity sensors, weight sensors (load cells), barcode readers, RFID readers or others. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control and/or processing functions of the system or the control and/or processing functions of any component thereof.

It is to be clearly understood that the above description is intended by way of illustration and example only, is not intended to be taken by way of limitation, and that other changes and modifications are possible. For example, while the primary embodiment depicts a conveyor system that diverts items traveling in one lane into multiple lanes, the system could be used to combine items traveling in multiple lanes into a single lane (or a smaller number of multiple lanes). In such a case the travel direction along the system 5 shown in FIG. 1 may simply be the reverse of that shown, meaning that the inlet and outlet ends of the conveyor segments 16 and 18 would be reversed).

What is claimed is:

1. A system for diverting objects traveling along a conveyor, comprising:
    an upstream conveyor segment having an inlet end and an outlet end;
    a downstream conveyor segment having an inlet end and an outlet end, wherein the inlet end of the downstream conveyor segment is located to receive items from the outlet end of the upstream conveyor segment;
    a conveyor shift mechanism linked to both the outlet end of the upstream conveyor segment and the inlet end of the downstream conveyor segment for carrying out lateral movement of the outlet end of the upstream conveyor segment in a first lateral direction while simultaneously carrying out lateral movement of the inlet end of the downstream conveyor segment in a second lateral direction that is opposite the first lateral direction;
    wherein the conveyor shift mechanism comprises a rotatable arm below the outlet end of the upstream conveyor segment and the inlet end of the downstream conveyor segment, the rotatable arm having a first side linked to an underside of the outlet end of the upstream conveyor segment and a second side linked to an underside of the inlet end of the downstream conveyor segment.

2. The system of claim 1 wherein the first side of the rotatable arm includes a first transfer link that rides within and along a first guide slot of the outlet end of the upstream conveyor segment, and the second side of the rotatable arm includes a second transfer link that rides within and along a second guide slot of the inlet end of the downstream conveyor segment.

3. The system of claim 2 wherein the first transfer link comprises a first pin member and the second transfer link comprises a second pin member.

4. The system of claim 3 wherein the first pin member rotates during movement within the first guide slot, and the second pin member rotates during movement within the second guide slot.

5. A system for diverting objects traveling along a conveyor, comprising:
an upstream conveyor segment having an inlet end and an outlet end;
a downstream conveyor segment having an inlet end and an outlet end, wherein the inlet end of the downstream conveyor segment is located to receive items from the outlet end of the upstream conveyor segment;
a conveyor shift mechanism linked to both the outlet end of the upstream conveyor segment and the inlet end of the downstream conveyor segment for carrying out lateral movement of the outlet end of the upstream conveyor segment in a first lateral direction while simultaneously carrying out lateral movement of the inlet end of the downstream conveyor segment in a second lateral direction that is opposite the first lateral direction;
wherein the conveyor shift mechanism comprises a rotatable arm having a first side linked to the outlet end of the upstream conveyor segment and a second side linked to the inlet end of the downstream conveyor segment;
wherein the first side of the rotatable arm includes a first transfer link that rides within a first guide slot of the outlet end of the upstream conveyor segment, and the second side of the rotatable arm includes a second transfer link that rides within a second guide slot of the inlet end of the downstream conveyor segment;
wherein the first transfer link comprises a first pin member and the second transfer link comprises a second pin member;
wherein the first pin member rotates during movement within the first guide slot, and the second pin member rotates during movement within the second guide slot;
wherein the first guide slot is fixed at an underside of the outlet end of the upstream conveyor segment, and the second guide slot is fixed at an underside of the inlet end of the downstream conveyor segment.

6. The system of claim 5 wherein the first guide slot is linear and the second guide slot is linear.

7. The system of claim 1 wherein the conveyor shift mechanism includes a motor located below the rotatable arm and connected to selectively rotate the rotatable arm.

8. The system of claim 7 wherein the motor includes an output shaft operatively connected to the rotatable arm between the first side and the second side such that the rotatable arm is rotatable back and forth about a rotation axis that located at an intermediate point between the first side and the second side.

9. The system of claim 1 wherein:
the inlet end of the upstream conveyor segment is pivotable about a first pivot axis that is proximate the inlet end and has a fixed position, the outlet end of the upstream conveyor segment is also pivotable about the first pivot axis, and the outlet end of the upstream conveyor segment pivots about the first pivot axis to achieve lateral shifting of the outlet end of the upstream conveyor segment;
the outlet end of the downstream conveyor segment is pivotable about a second pivot axis that is proximate the outlet end and has a fixed position, the inlet end of the downstream conveyor segment is also pivotable about the second pivot axis, and the inlet end of the downstream conveyor segment pivots about the second pivot axis to achieve lateral shifting of the inlet end of the downstream conveyor segment.

10. The system of claim 9 wherein:
the inlet end of the upstream conveyor segment is positioned adjacent an infeed conveyor and maintains a substantially unchanged lateral position relative to the infeed conveyor;
the outlet end of the downstream conveyor segment is positioned adjacent an outfeed conveyor and maintains a substantially unchanged lateral position relative to the outfeed conveyor.

11. The system of claim 7 wherein:
a footprint defined by the motor and the rotatable arm is located entirely within both a lateral movement footprint of the outlet end of the upstream conveyor segment and a lateral movement footprint of the inlet end of the downstream conveyor segment.

12. The system of claim 11 wherein the motor has a substantially vertical output axis that passes through a central portion of the rotatable arm.

13. The system of claim 1 wherein the upstream conveyor segment has a width dimension that is smaller than a width dimension of the downstream conveyor segment.

14. The system of claim 1, further comprising:
at least one stop positioned to contact a portion of one of the upstream conveyor segment or the downstream conveyor segment so as to limit lateral shifting of both the outlet end of the upstream conveyor segment and the inlet end of the downstream conveyor segment.

15. The system of claim 14 wherein a lateral position of the stop is adjustable.

16. The system of claim 14 wherein the at least one stop comprises a first stop on one lateral side and a second stop on an opposite lateral side.

17. A system for diverting objects traveling along a conveyor, comprising:
an upstream conveyor segment having an inlet end and an outlet end;
a downstream conveyor segment having an inlet end and an outlet end, wherein the inlet end of the downstream conveyor segment is located to receive items from the outlet end of the upstream conveyor segment;
a conveyor shift mechanism linked to both the outlet end of the upstream conveyor segment and the inlet end of the downstream conveyor segment for carrying out lateral movement of the outlet end of the upstream conveyor segment in a first lateral direction while simultaneously carrying out lateral movement of the inlet end of the downstream conveyor segment in a second lateral direction that is opposite the first lateral direction;
wherein the conveyor shift mechanism comprises:
a rotatable arm below the upstream conveyor segment and the downstream conveyor segment, the rotatable arm having a first side linked to an underside of the outlet end of the upstream conveyor segment and a second side linked to an underside of the inlet end of the downstream conveyor segment; and a motor connected to rotate the arm, the motor positioned below the rotatable arm and having a substantially vertical output axis that passes through the rotatable arm.

18. The system of claim 17 wherein:

the conveyor shift mechanism further comprises:

a controller connected to selectively control operation of the motor to repeatedly pivot the outlet end of the upstream conveyor segment and the inlet end of the downstream conveyor segment.

19. The system of claim 17, wherein the first side of the rotatable arm is linked to the underside of the outlet end of the upstream conveyor segment via a first slot and pin arrangement at the underside of the outlet end of the upstream conveyor segment, and the second side of the rotatable arm is linked to the underside of the inlet end of the downstream conveyor segment by a second slot and pin arrangement at the underside of the inlet end of the downstream conveyor segment.

20. The system of claim 19, wherein a pin of the first slot and pin arrangement rides within and along a slot of the first slot and pin arrangement, and a pin of the second slot and pin arrangement rides within and along a slot of the second slot and pin arrangement.

\* \* \* \* \*